(12) United States Patent
He et al.

(10) Patent No.: US 10,123,489 B2
(45) Date of Patent: Nov. 13, 2018

(54) PLANT GROWTH SYSTEM AND METHOD FOR CONTROLLING PLANT GROWTH

(71) Applicant: BOE TECHNOLOGY GROUP CO., LTD., Beijing (CN)

(72) Inventors: Lin He, Beijing (CN); Fei Liu, Beijing (CN); Xiaohua Feng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 685 days.

(21) Appl. No.: 14/426,648

(22) PCT Filed: May 21, 2014

(86) PCT No.: PCT/CN2014/077984
§ 371 (c)(1),
(2) Date: Mar. 6, 2015

(87) PCT Pub. No.: WO2015/089989
PCT Pub. Date: Jun. 25, 2015

(65) Prior Publication Data
US 2016/0029574 A1     Feb. 4, 2016

(30) Foreign Application Priority Data
Dec. 17, 2013    (CN) .......................... 2013 1 0693860

(51) Int. Cl.
| | |
|---|---|
| A01G 7/04 | (2006.01) |
| A01G 9/02 | (2018.01) |
| A01G 9/24 | (2006.01) |
| G05B 15/02 | (2006.01) |
| A01G 9/20 | (2006.01) |

(52) U.S. Cl.
CPC .............. *A01G 9/023* (2013.01); *A01G 7/045* (2013.01); *A01G 9/20* (2013.01); *A01G 9/24* (2013.01); *G05B 15/02* (2013.01)

(58) Field of Classification Search
CPC .......... A01G 7/045; A01G 9/023; A01G 9/20; A01G 9/24; G05B 15/02
See application file for complete search history.

(56) References Cited

U.S. PATENT DOCUMENTS

| | | | |
|---|---|---|---|
| 8,373,361 B2* | 2/2013 | Smits | A01G 7/045 |
| | | | 315/297 |
| 8,689,483 B2* | 4/2014 | Lin | A01K 1/02 |
| | | | 47/17 |

(Continued)

FOREIGN PATENT DOCUMENTS

| | | |
|---|---|---|
| CN | 1069162 A | 2/1993 |
| CN | 1658187 A | 8/2005 |

(Continued)

OTHER PUBLICATIONS

International Search Report and Written Opinion dated Sep. 16, 2014 regarding PCT/CN2014/077984. Translation provided by Dragon Intellectual Property Law Firm.

(Continued)

*Primary Examiner* — Abdelmomiem Elamin
(74) *Attorney, Agent, or Firm* — Harness, Dickey & Pierce, P.L.C.

(57) ABSTRACT

The present disclosure provides a plant growth system and a method for controlling plant growth. The plant growth system includes a cabinet within which partitions are provided so as to divide an interior of the cabinet into a plurality of plant growth compartments, wherein at least one side wall of the cabinet is provided with a touchable; transparent display panel capable of being switched to black screen display.

19 Claims, 5 Drawing Sheets

(56) References Cited

U.S. PATENT DOCUMENTS

| | | | | |
|---|---|---|---|---|
| 9,206,966 B2* | 12/2015 | Morgan | ............... | F21V 21/005 |
| 2001/0047618 A1* | 12/2001 | Fang | ..................... | A01G 7/045 |
| | | | | 47/65.5 |
| 2004/0163308 A1* | 8/2004 | Uchiyama | ............. | A01G 7/045 |
| | | | | 47/1.01 R |
| 2009/0199470 A1* | 8/2009 | Capen | .................. | A01G 7/045 |
| | | | | 47/58.1 LS |
| 2010/0289411 A1* | 11/2010 | Smits | .................... | A01G 7/045 |
| | | | | 315/113 |
| 2012/0265713 A1* | 10/2012 | Kim | ........................ | G09F 5/00 |
| | | | | 705/500 |
| 2013/0006401 A1* | 1/2013 | Shan | ...................... | A01G 1/00 |
| | | | | 700/90 |

FOREIGN PATENT DOCUMENTS

| | | | |
|---|---|---|---|
| CN | 102433259 A | 5/2012 | |
| CN | 102498974 A | 6/2012 | |
| CN | 103098693 A | 5/2013 | |
| CN | 103246102 A | 8/2013 | |
| CN | 203240854 U | 10/2013 | |
| JP | 2004129621 A | 4/2004 | |

OTHER PUBLICATIONS

Chinese Office Action dated Aug. 18, 2014 regarding Chinese Application No. 201310693860.3. Translation provided by Dragon Intellectual Property Law Firm.

\* cited by examiner

PLANT GROWTH SYSTEM AND METHOD FOR CONTROLLING PLANT GROWTH

CROSS-REFERENCE TO RELATED APPLICATIONS

This application is the U.S. national phase of PCT Application No. PCT/CN2014/077984 filed on May 21, 2014, which claims priority to Chinese Patent Application No. 201310693860.3 filed on Dec. 17, 2013, the disclosures of which are incorporated in their entirety by reference herein.

TECHNICAL FIELD

The present disclosure relates to the field of family-style plant growth technology, in particular to a plant growth system and a method for controlling plant growth.

BACKGROUND

Along with the gradual improvement of people's living standards and the change in food demands, a healthy, green, environmental-friendly and convenient lifestyle has drawn more and more attention, and sanitary, nutritive and healthy foods have become more and more popular. Among these foods, vegetable products that are green, pollution-free, fresh and clean are especially important for people's modern life. How to produce these vegetables rapidly has become a popular topic in recent years.

A plant growth factory (i.e., a plant growth system), as an up-to-date technology for plant cultivation, can provide an optimal environment for the growth and development of plants. Due to the integration with a full-automatic and full-intelligent environment simulation technique, it can establish an optimal artificial environment for the growth and development of the plants, and thus it is a production mode capable of being completely-controlled and managed at the people's wills. As the most-economical agricultural production mode, it uses a fully industrialized, process-oriented operation mode so as to avoid any interference from the outside climate factors, thereby to precisely simulate the cultivation environments, and improve the quality and yield of the plants. Hence, the plant growth system has distinct advantages over a traditional cultivation mode.

Currently, for an existing family-style plant growth factory, an artificial lighting system is used to provide artificial light for the plants, and a cabinet door thereof is mainly made of glass. In the daytime, the transparent cabinet door will allow external light to irradiate on the plants, and thus the controllability of the plant growth will be adversely affected. In the night, the transparent cabinet door will allow light from the artificial lighting system to pass therethrough, and thus unnecessary losses and light pollution will occur. In order to overcome these drawbacks, usually a louver or curtain is further mounted outside the cabinet door so as to block the light. However, due to the high-humidity environment within a cabinet, the louver or curtain will be readily damaged, thereby a light-shielding effect will be adversely affected. In addition, an additional process for mounting the louver or certain is required, so the cost will be increased.

SUMMARY

An object of the present disclosure is to provide a plant growth system and a method for controlling plant growth, so as to prevent a light-shielding effect from being adversely affected due to a louver or curtain mounted outside a cabinet door of an existing plan growth system.

In one aspect, the present disclosure provides a plant growth system, including a cabinet within which partitions are provided so as to divide an interior of the cabinet into a plurality of plant growth compartments, in which at least one side wall of the cabinet is provided with a touchable, transparent display panel capable of being switched to black screen display.

Alternatively, apart from the side wall provided with the transparent display panel, other walls of the cabinet are made of light-adjustable glass.

Alternatively, a tray for carrying a plant, a plant growth environment controlling unit, and a lighting unit serving as a light source for transparent display and configured to control the plant growth in the tray are provided in each plant growth compartment.

Alternatively, the lighting unit is a white-light LED unit or an OLED unit.

Alternatively, the lighting unit is provided at a top or a side wall of the plant growth compartment.

Alternatively, a net bag structure for defining a position of the plant is provided in the tray.

Alternatively, an image acquiring unit for acquiring plant growth information is provided in each plant growth compartment.

Alternatively, the plant growth environment controlling unit includes:

a collecting unit configured to collect environmental information in the plant growth compartment;

a signal processing unit connected to the collecting unit and configured to determine a control signal in accordance with a difference between the environmental information collected by the collecting unit and predetermined information; and an executing unit configured to adjust environmental factors in the plant growth compartment in accordance with the control signal.

Alternatively, the collecting unit includes at least one of a humidity sensor, a temperature sensor, a nutrient liquid level sensor, and a carbon dioxide content sensor.

Alternatively, the executing unit includes a humidity adjuster corresponding to the humidity sensor, a temperature adjuster corresponding to the temperature sensor, a nutrient liquid feeder corresponding to the nutrient liquid level sensor, and a carbon dioxide adjuster corresponding to the carbon dioxide content sensor.

Alternatively, a seeder for sowing seeds onto the tray is provided at a top wall of each plant growth compartment.

Alternatively, the plant growth system further includes a solar cell panel arranged outside the cabinet.

Alternatively, white light from the lighting unit has a central wavelength of 660 nm±10 nm or 450 nm±10 nm.

Alternatively, pairs of delimiting slots for delimiting positions of the partitions are provided at an inner wall of the cabinet of the plant growth system.

In another aspect, the present disclosure provides a method for controlling plant growth, including the steps of:

controlling a transparent display panel to be switched between black screen display and transparent display as required;

controlling a plant growth environment in each plant growth compartment in a plant growth system by a plant growth environment controlling unit, and acquiring a plant growth image in the plant growth compartment by an image acquiring unit;

determining whether or not a plant is ripe in accordance with acquired plant growth image; and adjusting an environment in the plant growth compartment to a freshness-keeping state by the plant growth environment controlling unit, when it is determined that the plant is ripe.

Alternatively, the step of controlling the plant growth environment in the plant growth compartment by the plant growth environment controlling unit includes:

acquiring a temperature in the plant growth compartment by a temperature sensor;

determining a temperature controlling signal in accordance with a difference between a predetermined temperature and acquired temperature; and controlling a temperature adjuster in accordance with the temperature controlling signal.

Alternatively, the step of controlling the plant growth environment in the plant growth compartment by the plant growth environment controlling unit includes:

acquiring a humidity in the plant growth compartment by a humidity sensor;

determining a humidity controlling signal in accordance with a difference between a predetermined humidity and acquired humidity; and controlling a humidity adjuster in accordance with the humidity controlling signal.

Alternatively, the step of controlling the plant growth environment in the plant growth compartment by the plant growth environment controlling unit includes:

acquiring a nutrient liquid level in a tray of the plant growth compartment by a nutrient liquid level sensor;

determining a nutrient liquid level controlling signal in accordance with a difference between a predetermined nutrient liquid level and acquired nutrient liquid level; and controlling a nutrient liquid feeder in accordance with the nutrient liquid level controlling signal.

Alternatively, the step of controlling the plant growth environment in the plant growth compartment by the plant growth environment controlling unit includes:

acquiring a carbon dioxide content in the plant growth compartment by a carbon dioxide content sensor;

determining a carbon dioxide controlling signal in accordance with a difference between a predetermined carbon dioxide content and acquired carbon dioxide content; and controlling a carbon dioxide content adjuster in accordance with the carbon dioxide controlling signal.

Alternatively, a CCD camera is used to periodically acquire the plant growth image in the plant growth compartment.

According to the plant growth system and the method for controlling plant growth in the present disclosure, the transparent display panel is used to replace an existing glass cabinet door as the side wall of the cabinet of the plant growth system. When the transparent display panel is switched to the black screen display, it is able to prevent the light in the plant growth system from passing therethrough in the night, thereby to prevent light pollution and improve a light utilization rate. In addition, it is also able to prevent the external light from irradiating on the plant in the daytime, thereby to prevent adverse influence on the controllability of the plant growth and improve the light-shielding effect. Moreover, when the transparent display panel is switched to a touchable, human-computer interaction interface, it is able to observe the plant growth conditions through the transparent display panel and control the plant growth system directly through the touchable transparent display panel, thereby to achieve intelligent control.

BRIEF DESCRIPTION OF THE DRAWINGS

In order to illustrate the technical solutions of the present disclosure or the prior art in a clearer manner, the drawings required for the present disclosure or the prior art will be described briefly hereinafter. Obviously, the following drawings merely relate to some embodiments of the present disclosure, and based on them, a person skilled in the art may obtain the other drawings without any creative effort.

DETAILED DESCRIPTION

Figure 1A:
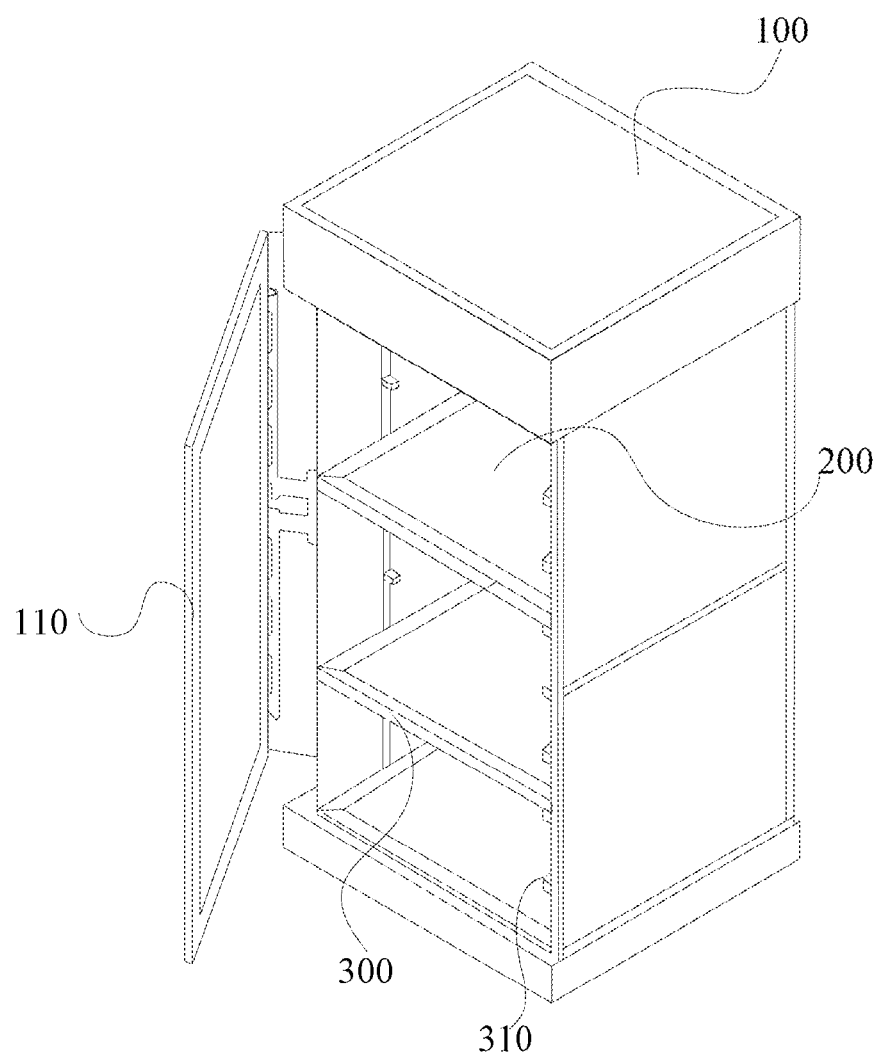
FIG. 1a-1c are schematic views showing a plant growth system according to an embodiment of the present disclosure.

A plant growth system and a method for controlling plant growth according to embodiments of the present disclosure will be described hereinafter in conjunction with drawings and embodiments.

It should be noted that, shapes and sizes of respective members in the drawings are for illustrative purposes only, but shall not used to show an actual scale of the plant growth system.

Figure 1B:
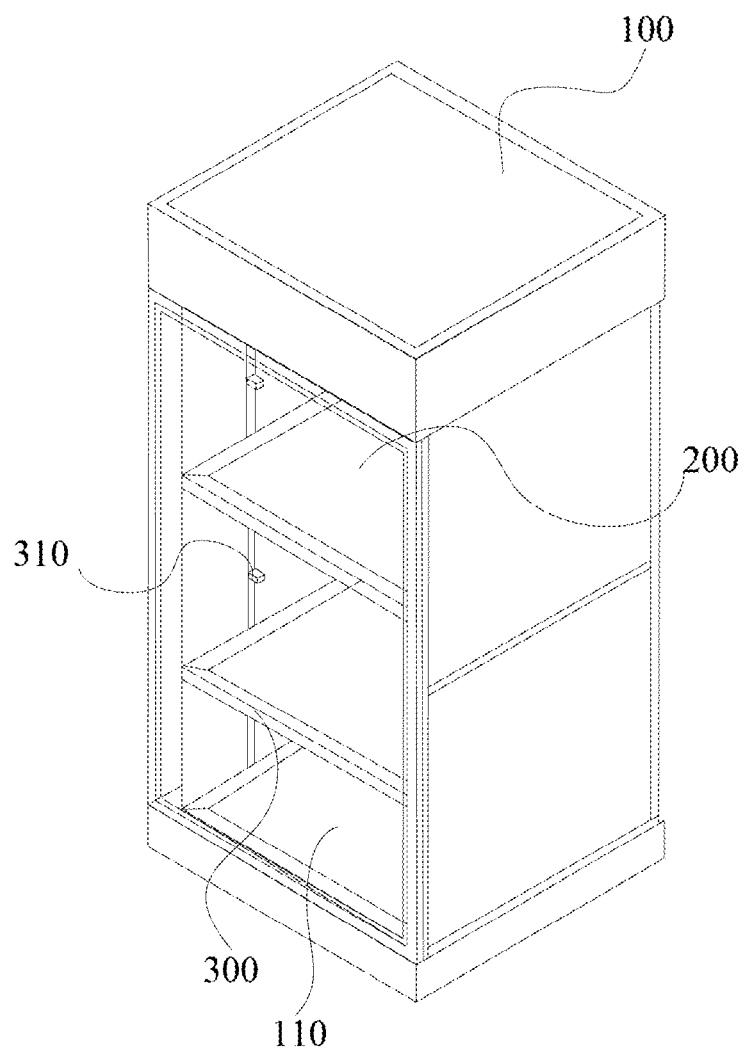
Figure 1C:
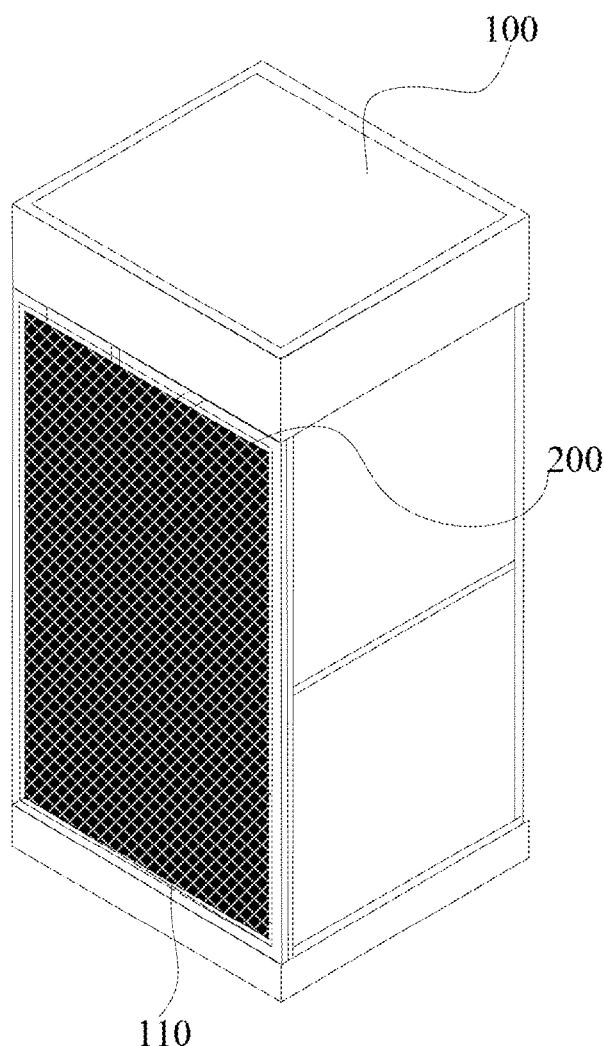

As shown in FIGS. 1a-1c, a plant growth system according to an embodiment of the present disclosure includes a cabinet 100 within which partitions 300 are provided so as to divide an interior of the cabinet 100 into a plurality of plant growth compartments 200, in which at least one side wall of the cabinet 100 is provided with a touchable, transparent display panel 110 capable of being switched to black screen display, e.g., the transparent display panel 110 is used as a door of the cabinet. FIG. 1a is a schematic view showing the plant growth system when the door is opened, FIG. 1b is a schematic view showing the plant growth system when the door is closed, and FIG. 1c is a schematic view showing the plant growth system when the transparent display panel 110 is switched to the black screen display.

The plant growth system according to embodiments of the present disclosure, the transparent display panel 110 is used to replace an existing glass cabinet door as the side wall of the cabinet of the plant growth system. When the transparent display panel 110 is switched to the black screen display, it is able to prevent the light in the plant growth system from passing therethrough in the night, thereby to prevent light pollution and improve a light utilization rate. In addition, it is also able to prevent the external light from irradiating on the plant in the daytime, thereby to prevent adverse influence on the controllability of the plant growth and improve the light-shielding effect. Moreover, when the transparent display panel 110 is switched to a touchable, human-computer interaction interface, it is able to observe the plant growth conditions through the transparent display panel 110 and control the plant growth system directly through the touchable transparent display panel, thereby to achieve intelligent control.

Alternatively, the transparent display panel 110 may be a transparent screen in a normally-white mode, i.e., in the case that no electricity is applied, the liquid crystal screen will be in a transparent state, and a black image will be displayed through the display control so that light cannot pass through the transparent screen. Also, the transparent display panel 110 may be a transparent screen in a normally-black mode, i.e., in the case that no electricity is applied, the liquid crystal screen will be in an opaque state, and a selected image will be displayed through the display control so that the light can pass through the transparent screen.

Alternatively, in the above-mentioned plant growth system according to embodiments of the present disclosure, in order to facilitate the observation of plant growth conditions in the respective plant growth compartments, the cabinet of the plant growth system may be made of light-adjustable glass. Apart from the side wall provided with the transparent display panel, i.e., apart from the cabinet door, other walls may all be made of light-adjustable glass, which may be implemented through liquid crystals arranged between two layers of glass. When an electric field is applied onto the liquid crystals, liquid crystal molecules will be aligned in an identical direction, so that the light can pass through the glass and a transparent effect can be achieved. When the electric field is cancelled, the light will be scattered by the liquid crystal molecules, so that the light cannot pass through the glass and an opaque effect can be achieved. Of course, the light-adjustable glass may be implemented in any other ways, which will not be particularly defined herein.

Alternatively, in the above-mentioned plant growth system according to embodiments of the present disclosure, positions of the partitions 300 for dividing the interior of the cabinet 100 into the plant growth compartments 200 may be adjusted up and down in accordance with a growth space desired for a plant. During the implementation, as shown in FIGS. 1a and 1b, pairs of delimiting slots 310 for delimiting the positions of the partitions may be provided at an inner wall of the cabinet 100 of the plant growth system. Prior to the cultivation of the plant, the positions of the partitions 300 will be adjusted, so as to form the growth space desired for the plant. As compared with an existing plant growth system where the compartments are of constant heights, the partitions 300 of the plant growth system according to embodiments of the present disclosure may be adjusted, and as a result, it is able to provide more flexibility for the plant growth system.

Figure 2:
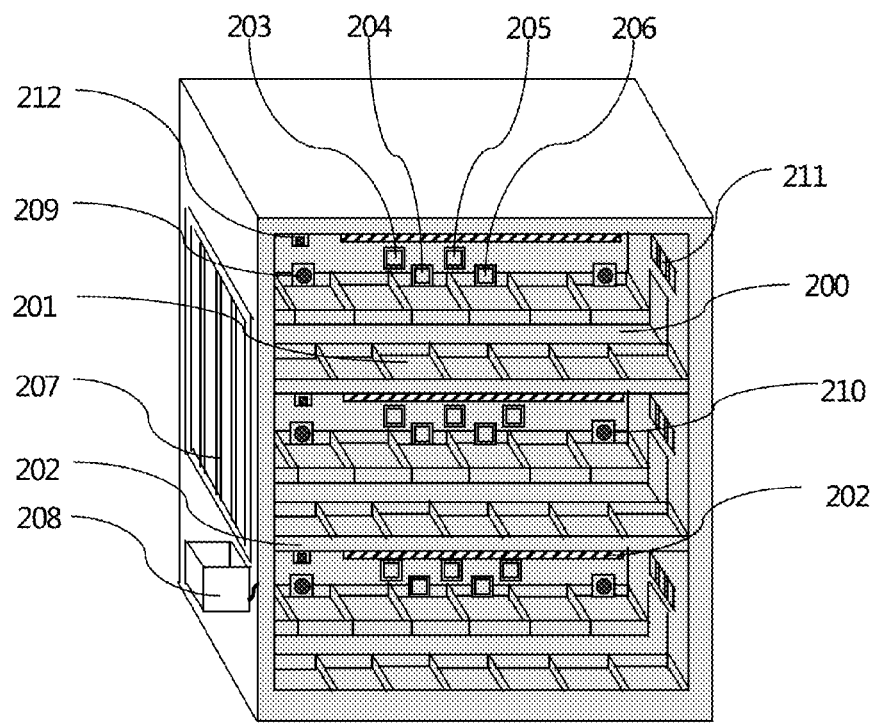
FIG. 2 is a schematic view showing a plant growth compartment in a plant growth system according to an embodiment of the present disclosure.

Alternatively, in the above-mentioned plant growth system according to embodiments of the present disclosure, as shown in FIG. 2, a tray 201 for carrying the plant, a plant growth environment controlling unit, and a lighting unit 202 serving as a light source for transparent display and configured to control the plant growth in the tray are provided in each plant growth compartment 200. Varieties of the plants in each plant growth compartment may be set in advance by means of a human-computer interactive interface of the transparent display panel, and the lighting unit 202 and the plant growth environment controlling unit in each plant growth compartment 200 may automatically control growth conditions of the plants in the tray 201 in accordance with predetermined parameters.

Alternatively, in the above-mentioned plant growth system according to embodiments of the present disclosure, the lighting unit 202 in each plant growth compartment 200 may be a white-light LED unit or an OLED unit, and it may be provided at a top or a side wall of the plant growth compartment. Alternatively, a central wavelength of the white light from the lighting unit 202 may be controlled, but not limited to, at 660 nm±10 nm or 450 nm±10 nm. As compared with the situation where the plant is irradiated with RGB light, when the plant is irradiated with the white light, a spectrum thereof is closer to the natural light, and thus it is able to facilitate the plant growth. Further, the white-light OLED unit may also be an OLED lighting panel, and the LED unit may be a LED light bar.

Alternatively, the lighting unit 202 in the plant growth compartment 200 may not only be used for the growth of the plant in the tray 201, but also serve as a light source for the transparent display. As a result, it is able to use the lighting unit for dual purposes and to save the energy, thereby to reduce the cost.

Alternatively, according to embodiments of the present disclosure, the plant growth system may further include a solar cell panel arranged outside the cabinet. The solar cell panel may convert optical energy into electric energy when the light irradiates it in the daytime, and then provide the required electric energy to the lighting unit and the plant growth environment controlling unit in the plant growth system, so as to save the energy, thereby to reduce the cost.

Alternatively, because the plant growth environment controlling unit is arranged independently in the plant growth compartment, it may automatically monitor the plant growth conditions and adjust the plant growth environment in real time in accordance with the varieties of the plants in the plant growth compartment, so as to enable the best growth of the plant. Alternatively, the plant growth environment controlling unit may include:

a collecting unit configured to collect environmental information in the plant growth compartment, such as temperature, humidity, carbon dioxide concentration and culture medium concentration;

a signal processing unit, e.g., a PLC (Programmable Logic Controller) chip, connected to the collecting unit via signals and configured to determine a control signal in accordance with a difference between the environmental information collected by the collecting unit and predetermined information; and an executing unit configured to adjust environmental factors in the plant growth compartment in accordance with the control signal.

During the implementation, as shown in FIG. 2, the collecting unit may include at least one of a humidity sensor 203, a temperature sensor 204, a nutrient liquid level sensor 205, and a carbon dioxide content sensor 206. Alternatively, all of the above sensors may be provided in each plant growth compartment, so as to monitor the growth environments of the plant in real time, thereby to automatically control the plant growth.

During the implementation, as shown in FIG. 2, the executing unit includes: a humidity adjuster corresponding to the humidity sensor 203, a temperature adjuster corresponding to the temperature sensor 204, a nutrient liquid feeder corresponding to the nutrient liquid level sensor 205, and a carbon dioxide adjuster corresponding to the carbon dioxide content sensor 206. A function of the humidity sensor may be achieved by a ventilator 207 or a heater. A function of the temperature adjuster may be achieved by heating or cooling with an air conditioner. A function of the nutrient liquid feeder may be achieved by a nutrient liquid tank 208, a nutrient liquid input passage 209 connecting the nutrient liquid tank 208 and the tray 201, and a waste liquid discharging passage 210 for discharging a waste liquid, in which a water suction pump for outputting the nutrient liquid from the nutrient liquid tank 208 into the tray 201 through the nutrient liquid input passage 209 when being started is provided in the nutrient liquid tank 208. A function of the carbon dioxide adjuster may be achieved by a carbon dioxide generator 211 and the ventilator 207.

Figure 3:
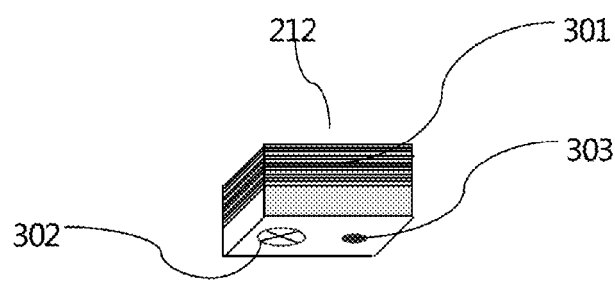
FIG. 3 is a schematic view showing a seeder in a plant growth system according to an embodiment of the present disclosure.

Alternatively, as shown in FIG. 2, a seeder 212 may be provided in, and generally at a top wall of, the plant growth compartment. Alternatively, as shown in FIG. 3, the seeder 212 may include one or more seed storage chambers 301, at a bottom wall of which a seed marker 302 and a hole 303 are provided. The hole 303 may be opened so that the seeds can fall into the tray 201 right therebelow, when the seeds need to be sowed. The seed marker 302 may be configured to show the varieties of the seeds in the seed storage chambers 301. During the implementation, the seed storage camber 301 may be relative fixed, and the tray 201 may be moved automatically, or by a mechanical arm, below the hole 303 of the seed storage chamber 301, so as to sow the seeds. Alternatively, the tray 201 may be relative fixed, and the seed storage chamber 301 may be moved automatically, or by the mechanical arm, above the tray 201, so as to sow the seeds.

Figure 4:
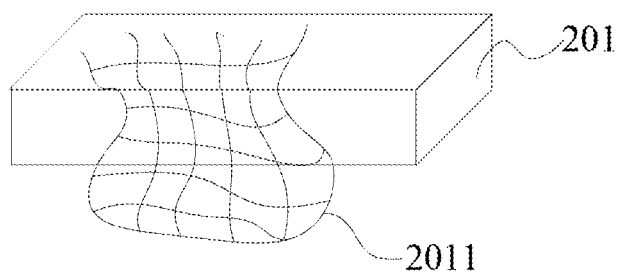
FIG. 4 is a schematic view showing a tray including a net bag structure in a plant growth system according to an embodiment of the present disclosure.

Alternatively, as shown in FIG. 4, a net bag structure 2011 for defining the position of the plant may also be provided in the tray 201, so as to fix the plant from a germination stage to a ripeness stage. A mesh size of the net bag structure 2011 may be set in such a manner so as to prevent the seeds from dropping therethrough. As a result, it is able to reduce a process of artificially transplanting a seedling to the tray after the seed germination, and maintain the plant growing gradually in the tray more firmly, thereby to achieve automatic growth of the plant.

Alternatively, an image acquiring unit for acquiring plant growth information may be provided in the plant growth compartment, e.g., a CCD camera may be used to periodically acquire an image of the plant growth condition. Of course, any other image acquiring units may be used to acquire the image, and it will not be particularly defined herein. As compared with the situation where the plant growth condition is determined by human eyes or by measuring the weight, the image acquiring unit is used in the present disclosure to automatically determine the plant growth condition, and as a result, it is able to prevent erroneous determination.

When it is determined that the plant is ripe after comparing acquired image of the plant growth condition with a standard image of the ripe plant, the plant growth environment controlling unit may be used to automatically adjust the environment in the plant growth compartment to a freshness-keeping state. As for the freshness-keeping state, the temperature in plant growth compartment may be maintained at 0 to 5° C., and the plant growth compartment may be maintained as a dark, i.e., light-free, room. Through maintaining the ripe plant at the freshness-keeping state by means of the plant growth environment unit, it is able to prolong the preservation time for the plant by two or three days.

Based on the same inventive concept, embodiments of the present disclosure further provide a method for controlling plant growth using the above-mentioned plant growth system. The method includes the steps of:

controlling the transparent display panel to be switched between the black screen display and the transparent display during a growth stage and a ripeness stage as required;

controlling a plant growth environment in each plant growth compartment in a plant growth system by a plant growth environment controlling unit, and acquiring the plant growth image in the plant growth compartment by an image acquiring unit;

determining whether or not the plant is ripe in accordance with the acquired plant growth image; and adjusting the environment in the plant growth compartment to the freshness-keeping state by the plant growth environment controlling unit, when it is determined that the plant is ripe.

As for the freshness-keeping state, a temperature in plant growth compartment may be maintained at 0 to 5° C., and the plant growth compartment may be maintained as a dark, i.e., light-free, room.

Alternatively, the step of controlling the plant growth environment in the plant growth compartment by the plant growth environment controlling unit includes:

acquiring the temperature in the plant growth compartment by the temperature sensor, determining the temperature controlling signal in accordance with a difference between the predetermined temperature and acquired temperature, and controlling the temperature adjuster in accordance with the temperature controlling signal;

acquiring a humidity in the plant growth compartment by the humidity sensor, determining the humidity controlling signal in accordance with a difference between the predetermined humidity and acquired humidity, and controlling the humidity adjuster in accordance with the humidity controlling signal;

acquiring the nutrient liquid level in the tray of the plant growth compartment by the nutrient liquid level sensor, determining the nutrient liquid level controlling signal in accordance with a difference between the predetermined nutrient liquid level and acquired nutrient liquid level, and controlling the nutrient liquid feeder in accordance with the nutrient liquid level controlling signal; and acquiring the carbon dioxide content in the plant growth compartment by the carbon dioxide content sensor, determining the carbon dioxide controlling signal in accordance with a difference between the predetermined carbon dioxide content and acquired carbon dioxide content, and controlling the carbon dioxide content adjuster in accordance with the carbon dioxide controlling signal.

According to embodiments of the present disclosure, the plant growth system and the method for controlling plant growth, the transparent display panel is used to replace an existing glass cabinet door as the side wall of the cabinet of the plant growth system. When the transparent display panel is switched to the black screen display, it is able to prevent the light in the plant growth system from passing therethrough in the night, thereby to prevent light pollution and improve a light utilization rate. In addition, it is also able to prevent the external light from irradiating on the plant in the daytime, thereby to prevent adverse influence on the controllability of the plant growth and improve the light-shielding effect. Moreover, when the transparent display panel is switched to a touchable, human-computer interaction interface, it is able to observe the plant growth conditions through the transparent display panel and control the plant growth system directly through the touchable transparent display panel, thereby to achieve intelligent control.

The above are merely the preferred embodiments of the present disclosure, and a person skilled in the art may make further modifications and improvements without departing from the principle of the present disclosure, and these modifications and improvements shall also fall within the scope of the present disclosure.

What is claimed is:

1. A plant growth system, comprising a cabinet within which partitions are provided so as to divide an interior of the cabinet into a plurality of plant growth compartments, wherein at least one side wall of the cabinet is provided with a touchable, transparent display panel capable of being switched to black screen display, a tray for carrying a plant, a plant growth environment controlling unit, and a lighting unit serving as a light source for transparent display and configured to control the plant growth in the tray are provided in each plant growth compartment, and white light from the lighting unit has a central wavelength of 660 nm±10 nm or 450 nm±10 nm, wherein a net bag structure for defining a position of the plant is provided in the tray.

2. The plant growth system according to claim 1, wherein apart from the side wall provided with the transparent display panel, other walls of the cabinet are made of light-adjustable glass.

3. The plant growth system according to claim 1, wherein the lighting unit is a white-light LED unit or an OLED unit.

4. The plant growth system according to claim 1, wherein the lighting unit is provided at a top or a side wall of the plant growth compartment.

5. The plant growth system according to claim 1, wherein an image acquiring unit for acquiring plant growth information is provided in each plant growth compartment.

6. The plant growth system according to claim 1, wherein the plant growth environment controlling unit comprises:
   a collecting unit configured to collect environmental information in the plant growth compartment;
   a signal processing unit connected to the collecting unit and configured to determine a control signal in accordance with a difference between the environmental information collected by the collecting unit and predetermined information; and
   an executing unit configured to adjust environmental factors in the plant growth compartment in accordance with the control signal.

7. The plant growth system according to claim 6, wherein the collecting unit comprises at least one of a humidity sensor, a temperature sensor, a nutrient liquid level sensor, and a carbon dioxide content sensor.

8. The plant growth system according to claim 6, wherein the executing unit comprises a humidity adjuster corresponding to the humidity sensor, a temperature adjuster corresponding to the temperature sensor, a nutrient liquid feeder corresponding to the nutrient liquid level sensor, and a carbon dioxide adjuster corresponding to the carbon dioxide content sensor.

9. The plant growth system according to claim 1, wherein a seeder for sowing seeds onto the tray is provided at a top wall of each plant growth compartment.

10. The plant growth system according to claim 1, further comprising a solar cell panel arranged outside the cabinet.

11. The plant growth system according to claim 1, wherein pairs of delimiting slots for delimiting positions of the partitions are provided at an inner wall of the cabinet of the plant growth system.

12. A method for controlling plant growth system, wherein the plant growth system comprises a cabinet within which partitions are provided so as to divide an interior of the cabinet into a plurality of plant growth compartments, wherein at least one side wall of the cabinet is provided with a touchable, transparent display panel capable of being switched to black screen display, a tray for carrying a plant, a plant growth environment controlling unit, and a lighting unit serving as a light source for transparent display and configured to control the plant growth in the tray are provided in each plant growth compartment, and white light from the lighting unit has a central wavelength of 660 nm±10 nm or 450 nm±10 nm, wherein a net bag structure for defining a position of the plant is provided in the tray; and The method comprising the steps of:
   providing the net bag structure for defining a position of the plant in the tray for carrying the plant in the plant growth compartment in the plant growth system;
   controlling the transparent display panel to be switched between the black screen display and the transparent display as required;
   controlling a plant growth environment in each plant growth compartment in the plant growth system by the plant growth environment controlling unit, and acquiring the plant growth image in the plant growth compartment by an image acquiring unit;
   determining whether or not the plant is ripe in accordance with acquired plant growth image; and
   adjusting an environment in the plant growth compartment to a freshness-keeping state by the plant growth environment controlling unit, when it is determined that the plant is ripe.

13. The method according to claim 12, wherein the step of controlling the plant growth environment in the plant growth compartment by the plant growth environment controlling unit comprises:
   acquiring a temperature in the plant growth compartment by a temperature sensor;
   determining a temperature controlling signal in accordance with a difference between a predetermined temperature and acquired temperature; and
   controlling a temperature adjuster in accordance with the temperature controlling signal.

14. The method according to claim 12, wherein the step of controlling the plant growth environment in the plant growth compartment by the plant growth environment controlling unit comprises:
   acquiring a humidity in the plant growth compartment by a humidity sensor;
   determining a humidity controlling signal in accordance with a difference between a predetermined humidity and acquired humidity; and
   controlling a humidity adjuster in accordance with the humidity controlling signal.

15. The method according to claim 12, wherein the step of controlling the plant growth environment in the plant growth compartment by the plant growth environment controlling unit comprises:
   acquiring a nutrient liquid level in the tray of the plant growth compartment by a nutrient liquid level sensor;
   determining a nutrient liquid level controlling signal in accordance with a difference between a predetermined nutrient liquid level and acquired nutrient liquid level; and
   controlling a nutrient liquid feeder in accordance with the nutrient liquid level controlling signal.

16. The method according to claim 12, wherein the step of controlling the plant growth environment in the plant growth compartment by the plant growth environment controlling unit comprises:
   acquiring a carbon dioxide content in the plant growth compartment by a carbon dioxide content sensor;
   determining a carbon dioxide controlling signal in accordance with a difference between a predetermined carbon dioxide content and acquired carbon dioxide content; and
   controlling a carbon dioxide content adjuster in accordance with the carbon dioxide controlling signal.

17. The method according to claim 12, wherein a CCD camera is used to periodically acquire the plant growth image in the plant growth compartment.

18. The plant growth system according to claim 1, further comprising:
- a ventilator, wherein the ventilator is arranged on a sidewall adjacent to a door of the cabinet, the transparent display panel serves as the door of the cabinet; and
- a nutrient liquid tank having a suction pump therein, wherein the nutrient liquid tank is arranged on an outside surface of the sidewall adjacent to the door and below the ventilator, and the suction pump is configured to output the nutrient liquid from the nutrient liquid tank into the tray through a nutrient liquid input passage.

19. The plant growth system according to claim 1, wherein the transparent display panel is configured to prevent light emitted from the lighting unit from passing therethrough, and/or to prevent external light from passing therethrough and entering the cabinet.

* * * * *